No. 680,058. Patented Aug. 6, 1901.
E. MEYER.
AUXILIARY POT HANDLE.
(Application filed Mar. 19, 1901.)
(No Model.)
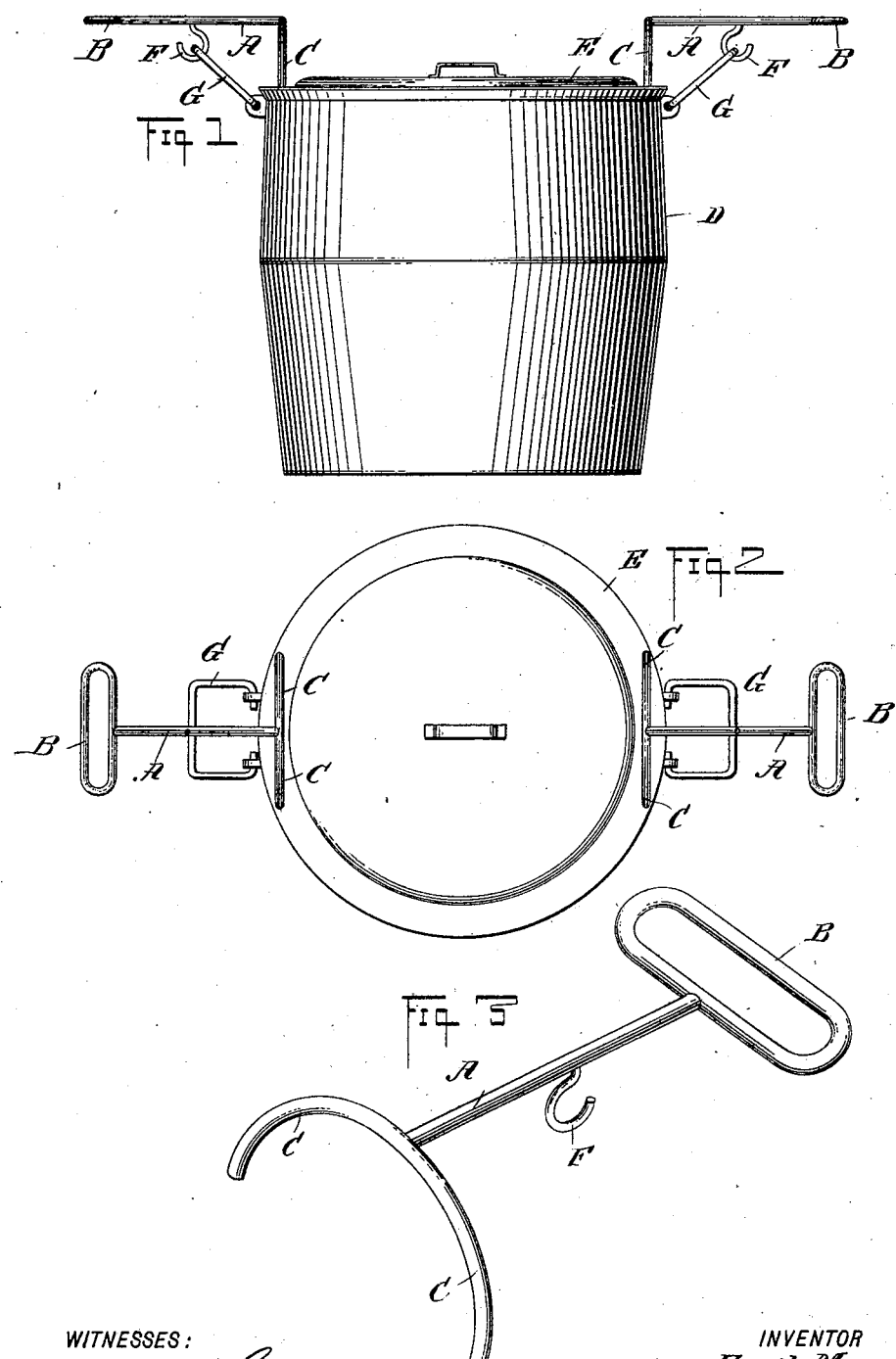
WITNESSES:
INVENTOR
Emil Meyer
BY
ATTORNEYS

UNITED STATES PATENT OFFICE.

EMIL MEYER, OF JERSEY CITY, NEW JERSEY, ASSIGNOR TO EMMA R. MEYER, OF NYACK, NEW YORK.

AUXILIARY POT-HANDLE.

SPECIFICATION forming part of Letters Patent No. 680,058, dated August 6, 1901.

Application filed March 19, 1901. Serial No. 51,865. (No model.)

*To all whom it may concern:*

Be it known that I, EMIL MEYER, a subject of the Emperor of Germany, residing at Jersey City, in the county of Hudson and State of New Jersey, have invented a new and Improved Auxiliary Pot-Handle, of which the following is a full, clear, and exact description.

The invention relates to culinary vessels, such as pots and kettles used for cooking food in water; and its object is to provide a new and improved auxiliary pot-handle which is simple and durable in construction and easily applied to a kettle or pot to permit the operator to conveniently move the pot about or to turn it over and pour off the liquid contents, but retain the solid matter after the cooking is done.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement. Fig. 2 is a plan view of the same, and Fig. 3 is an enlarged perspective view of the improvement.

The auxiliary pot-handle is used in pairs, as shown in Figs. 1 and 2, and each of the handles consists of a straight shank A, terminating at the outer end in a handle B and at the inner end in arms C, standing at a right angle to the shank A and curved outward and downward a suitable distance, as is plainly illustrated in the drawings, for the ends of the arms to rest either on the rim of the pot or kettle D or on the rim of the cover E, covering the pot or kettle D. On the shank A, approximately midway between the arms C and the handle B, is secured or formed a hook F, extending downwardly in alinement with the shank A, disposing the open end thereof toward the handle B, as is plainly indicated in Figs. 1 and 3, so that the hook F can be readily hooked upon an ordinary handle or bail G, fulcrumed on the sides of the pot or kettle D.

In using the device the pair of auxiliary handles are engaged by their hooks F with the handles G of the pot B, and then the arms C are caused to rest on the rim of the pot B, or the cover E in case the latter is used, so that the shanks A extend approximately in a horizontal direction, and the operator now taking hold of the handles B can readily lift the pot from or to the stove for turning the pot over and pouring off the liquid contained therein without danger of the pot slipping off the handles or the operator coming in contact with the heated pot.

It is understood that by the arrangement described the hands of the operator having hold of the handles D are removed a considerable distance from the pot B, and consequently the pot can be readily moved about or turned over without danger of the operator burning the fingers. By bending the arms C downward in opposite directions from the shank A and engaging the arms with the rim of the pot B or the cover E it is evident that a very firm hold is obtained as soon as the pot is lifted by the operator lifting the handles B, so that the pot can be conveniently turned over without danger of the arms C becoming displaced from the rim of the pot or cover.

Having thus fully described my invention, I claim as new and desire to secure by Letters Patent—

1. An auxiliary pot-handle consisting of a shank provided at its inner end with means to bear and fulcrum upon the top of the pot, and the hook depending from such shank between its ends and arranged for engagement with the pot handle or bail to support the pot substantially as set forth.

2. An auxiliary pot-handle, comprising a handled shank, arms extending from the inner end of the shank in opposite directions at right angles to the shank, and a hook on the shank between the ends thereof, the hook extending lengthwise of the shank at the under side thereof, the open end being toward the shank-handle, as set forth.

3. An auxiliary pot-handle, comprising a handled shank, arms extending from the inner end of the shank in opposite directions and approximately at right angles to the shank, the arms also being bent downward, and a hook on the shank between the ends thereof and extending lengthwise of the shank at the under side, the open end being toward the shank-handle, as set forth.

4. A device for use in handling pots composed of the pair of auxiliary handles each such handle being composed of a shank provided at its inner end with a depending portion to bear upon the top of the pot and between its ends with means for engagement with the bail of the pot all substantially as set forth.

5. An auxiliary pot-handle for use on a pot having side bails, and composed of the shank arranged to extend in use over the bail and fulcrum at its inner end upon the pot adjacent to said bail and provided at its under side between its ends with means for supporting the pot by engagement with the bail thereof at a point outside the circumference of the pot substantially as set forth.

6. The herein-described auxiliary pot-handle composed of the shank the arms extended from the inner end of the shank and arranged to bear upon the top of the pot, and the hook depending from the shank between its ends and arranged for engagement with the bail of the pot substantially as set forth.

In testimony whereof I have signed my name to this specification in the presence of two subscribing witnesses.

EMIL MEYER.

Witnesses:
THEO. G. HOSTER,
EVERARD BOLTON MARSHALL.